US008866063B2

(12) United States Patent
Ozcan et al.

(10) Patent No.: US 8,866,063 B2
(45) Date of Patent: Oct. 21, 2014

(54) LENS-FREE WIDE-FIELD SUPER-RESOLUTION IMAGING DEVICE

(75) Inventors: Aydogan Ozcan, Los Angeles, CA (US); Waheb Bishara, Menlo Park, CA (US)

(73) Assignee: The Regents of the University of California, Oakland, CA (US)

( * ) Notice: Subject to any disclaimer, the term of this patent is extended or adjusted under 35 U.S.C. 154(b) by 265 days.

(21) Appl. No.: 13/436,664

(22) Filed: Mar. 30, 2012

(65) Prior Publication Data

US 2012/0248292 A1 Oct. 4, 2012

Related U.S. Application Data

(60) Provisional application No. 61/470,155, filed on Mar. 31, 2011.

(51) Int. Cl.
| | | |
|---|---|---|
| H01J 3/14 | (2006.01) | |
| H01J 5/16 | (2006.01) | |
| G02B 21/00 | (2006.01) | |
| G03H 1/08 | (2006.01) | |
| G03H 1/00 | (2006.01) | |
| G03H 1/02 | (2006.01) | |
| G03H 1/04 | (2006.01) | |

(52) U.S. Cl.
CPC .............. *G02B 21/00* (2013.01); *G02B 21/002* (2013.01); *G02B 21/0004* (2013.01); *G03H 1/0866* (2013.01); *G03H 2001/005* (2013.01); *G03H 2001/0212* (2013.01); *G03H 2001/0447* (2013.01); *G03H 2001/045* (2013.01); *G03H 2222/24* (2013.01); *G03H 2240/56* (2013.01); *G03H 1/0443* (2013.01)
USPC ......................................... 250/216; 250/234

(58) Field of Classification Search
CPC .............. G02B 21/00; G02B 21/0004; G02B 21/0024; G02B 21/0028; G02B 21/0036; G02B 21/0044; G02B 21/0048; G02B 21/0064; G02B 21/008; G02B 26/123; G02B 27/4227
USPC ................. 250/201.3, 201.4, 559.06, 559.48, 250/227.26, 234, 216; 356/489, 495, 511, 356/512, 515; 359/201.1, 202.1
See application file for complete search history.

(56) References Cited

U.S. PATENT DOCUMENTS

| | | | | |
|---|---|---|---|---|
| 7,633,631 | B2 * | 12/2009 | Fukutake | ...................... 356/521 |
| 2004/0264637 | A1 * | 12/2004 | Wang | .............................. 378/43 |

FOREIGN PATENT DOCUMENTS

WO PCT/US11/064701 6/2011

OTHER PUBLICATIONS

Bishara et al., Lensfree on-chip microscopy over a wide field-of-view using pixel super resolution, Optics Express, 18(11),11181-11191 (May 24, 2010).

(Continued)

*Primary Examiner* — Francis M Legasse, Jr.
(74) *Attorney, Agent, or Firm* — Vista IP Law Group LLP

(57) ABSTRACT

A system for imaging objects within a sample includes an image sensor and a sample holder configured to hold the sample, the sample holder disposed adjacent to the image sensor. The system further includes an illumination source configured to scan in two or three dimensions relative to the sensor array and illuminate the sample at a plurality of different locations. The illumination source may include, by way of example, LEDs, laser diodes, or even a screen or display from a portable electronic device. The system includes least one processor configured to reconstruct an image of the sample based on the images obtained from illumination source at the plurality of different scan positions.

29 Claims, 12 Drawing Sheets

(56) References Cited

OTHER PUBLICATIONS

Bishara et al., Holographic pixel super-resolution in portable lensless on-chip microscopy using a fiber-optic array, Lab on a Chip 11, 1276-1279(2011).

Hardie et al. Joint map registration and high-resolution image estimation using a sequence of under sampled images, IEEE Transactions in Image Processing, 6(12), 1621-1633 (1997).

Isikman et al., Lensfree Cell Holography On a Chip: From Holographic Cell Signatures to Microscopic Reconstruction, Proceedings of IEEE Photonics Society Annual Fall Meeting, pp. 404-405 (2009).

Mudanyali et al., Compact, Light-weight and Cost-effective Microscope based on Lensless Incoherent Holography for Telemedicine Applications, Lab Chip 10:1417-1428 (2010).

Oh et al., On-chip differential interference contrast microscopy using lens-less digital holography. Opt Express.;18 (5):4717-4726 (2010).

International Application No. PCT/US2011/064701, Applicant: The Regents of the University of California, entitled: Method and Device for Holographic Opto-Fluidic Microscopy, Filed: Dec. 13, 2011.

Ozcan et al., Ultra wide-filed lens-free monitoring of cells on-chip, Lab on Chip 8, 89-106, Nov. 1, 2007.

Ozcan et al., Lens-free On-Chip Cytometry for wireless Health Diagnosis, IEEE LEOS Newsletter, Oct. 2008.

Seo et al., Lensfree On-chip Cytometry Using Tunable Monochromatic Illumination and Digital Noise Reduction, Multi-color LUCAS, Sep. 2008.

Seo et al., Lensfree holographic imaging for on-chip cytometry and diagnostics, Lab on a Chip, 9, 777-787, Dec. 5, 2008.

Su et al., Towards Wireless Health: Lensless On-Chip Cytometry, Biophotonics, Dec. 2008.

Su et al., High-Throughput Lensfree Imaging and Characterization of Heterogeneous Cell Solution On a Chip, Biotechnology and Bioengineering, Sep. 8, 2008.

Mudanyali et al., Lensless On-chip Imaging of Cells Provides a New Tool for High-throughput Cell-Biology and Medical Diagostics, Journal of Visualized Experiments, Dec. 14, 2009.

Bishara et al., Lensfree on-chip microscopy over a wide field-of-view using pixel super-resolution, Optics Express, vol. 18 No. 11, May 24, 2010.

Coskun et al., Wide field-of-view lens-free fluorescent imaging on a chip, Lab Chip, 10(7), 824-827, Apr. 7, 2010.

Coskun et al., Lensless wide-field fluorescent imaging on a chip using compressive decoding of sparse objects, Optics Express, vol. 18 No. 10, May 5, 2010.

Khademhosseinieh et al., Lensfree color imaging on a nanostructured chip using compressive decoding, Applied Physics Letters, 97, 211112-1, Nov. 24, 2010.

Khademhosseinieh et al., Lensfree on-chip imaging using nanostructured surfaces, Applied Physics Letters, 96, 171106, Apr. 30, 2010.

Ozcan, Smart technology for global access to healthcare, SPIE, Mar. 16, 2010.

Ozcan et al., Lensfree on-chip holography facilitates novel microscopy applications, SPIE, May 19, 2010.

\* cited by examiner

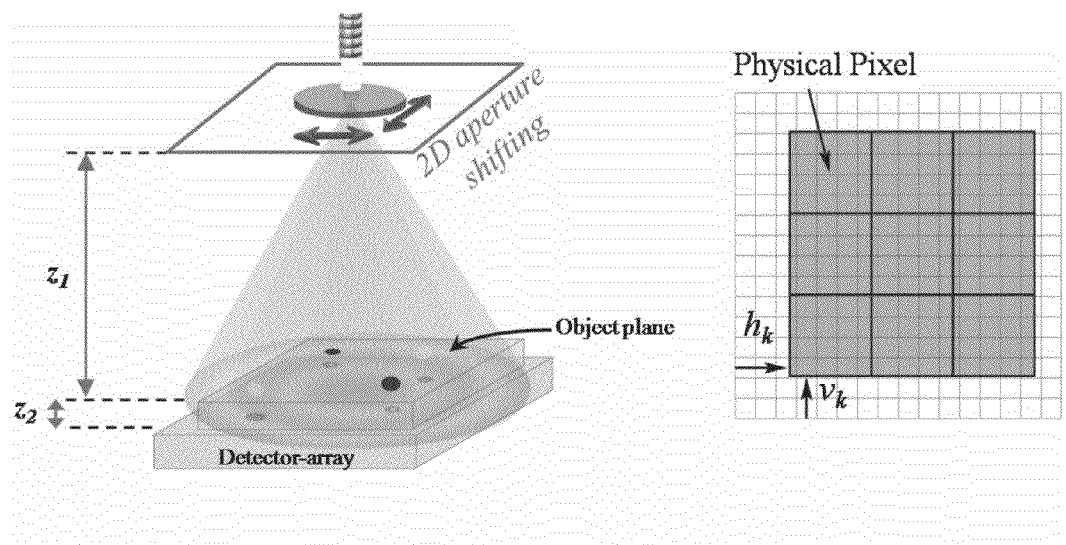
FIG. 1C                    FIG. 1D

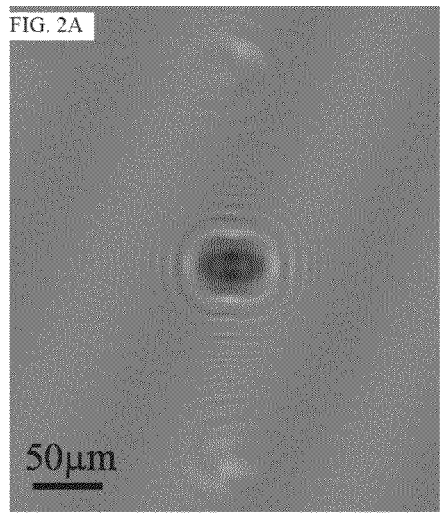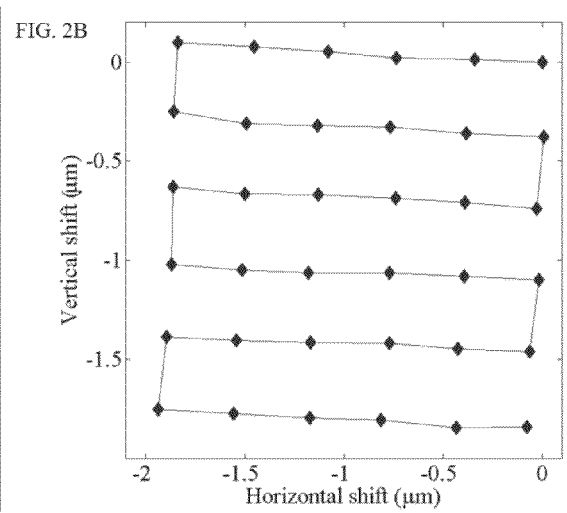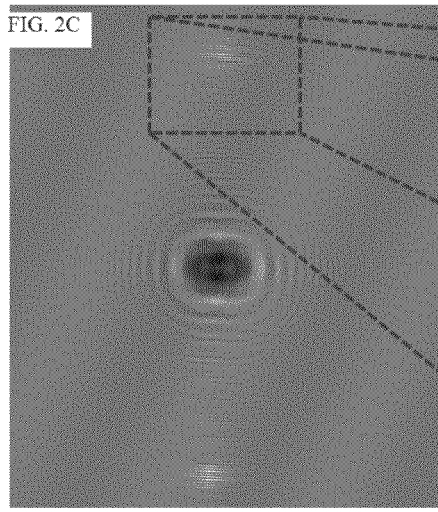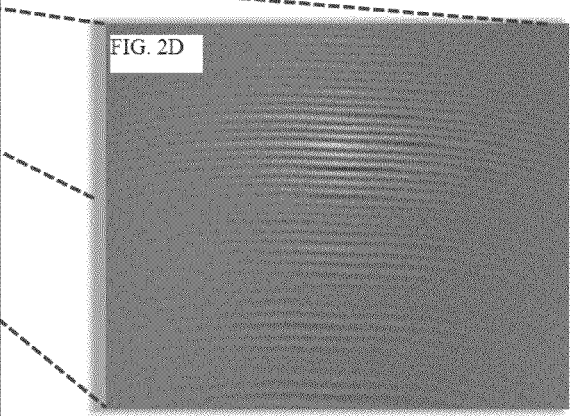

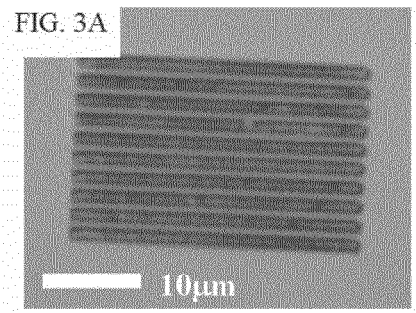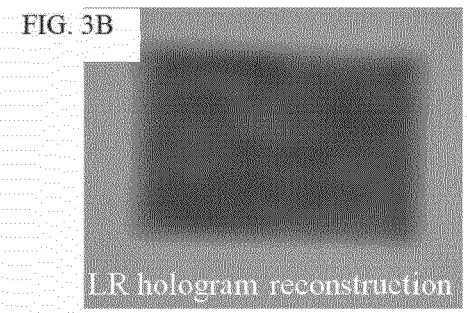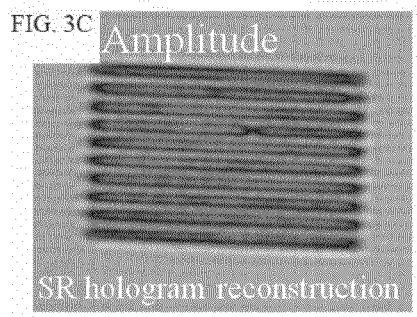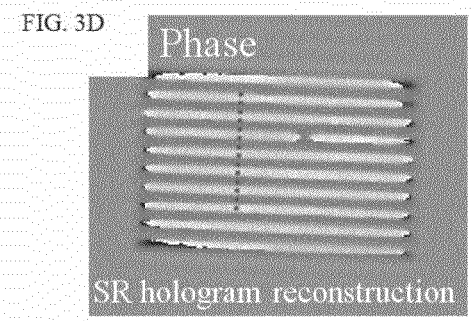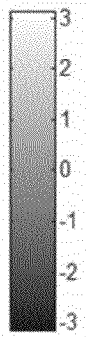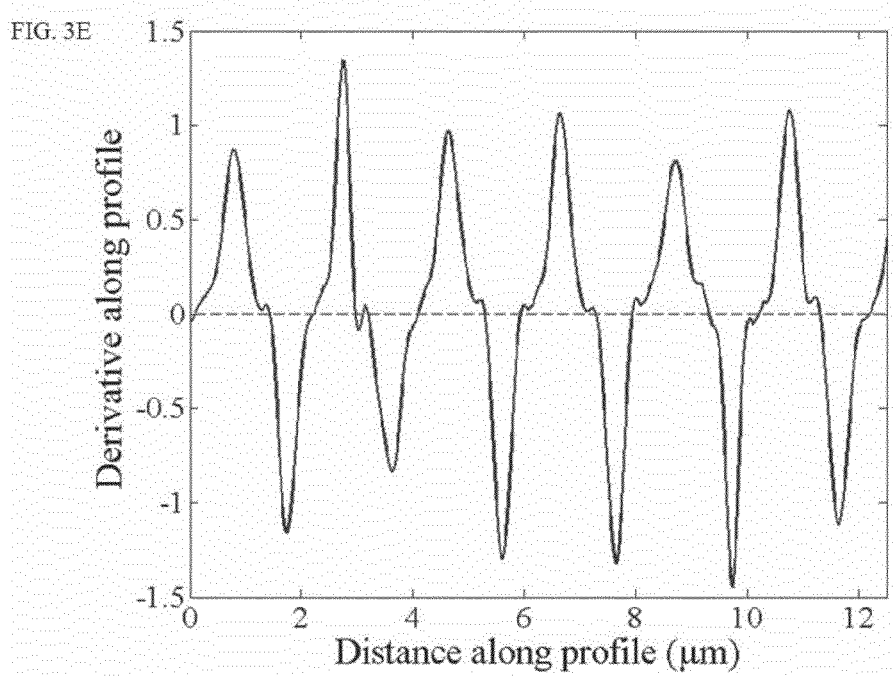

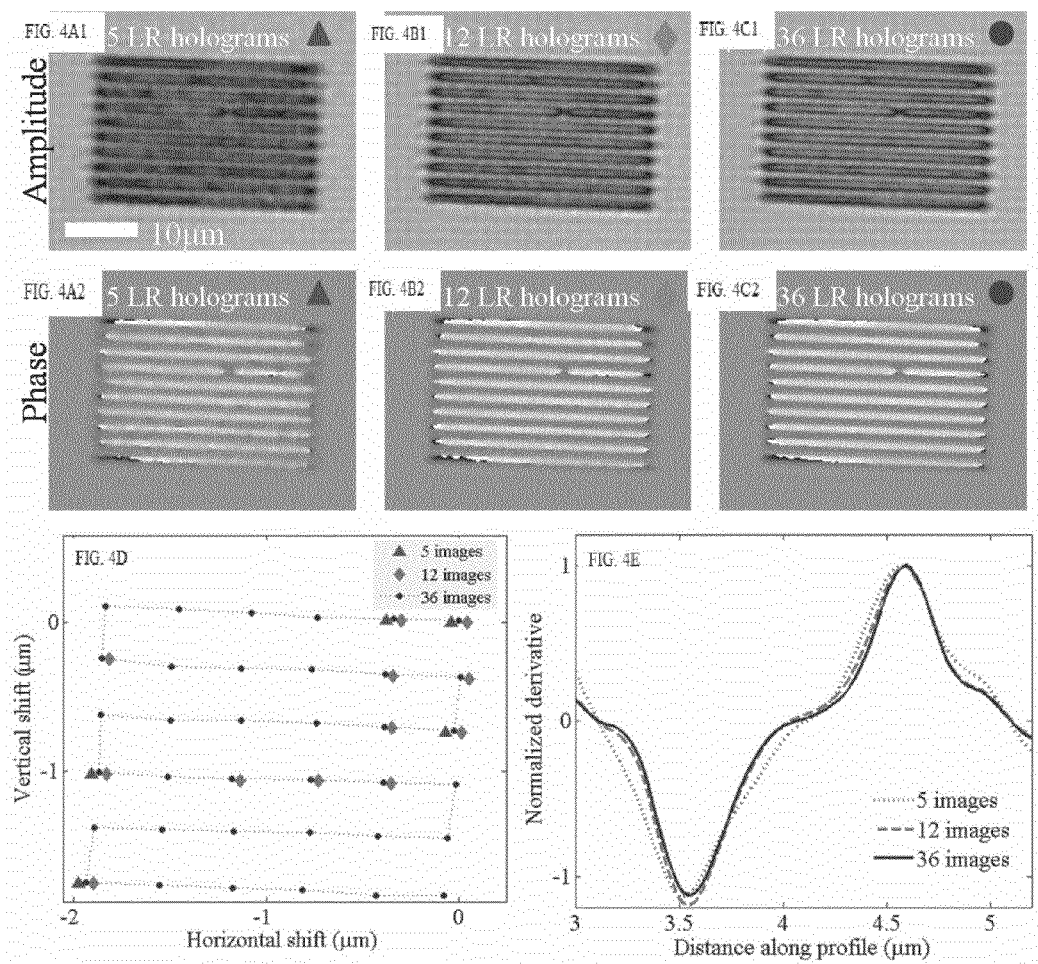

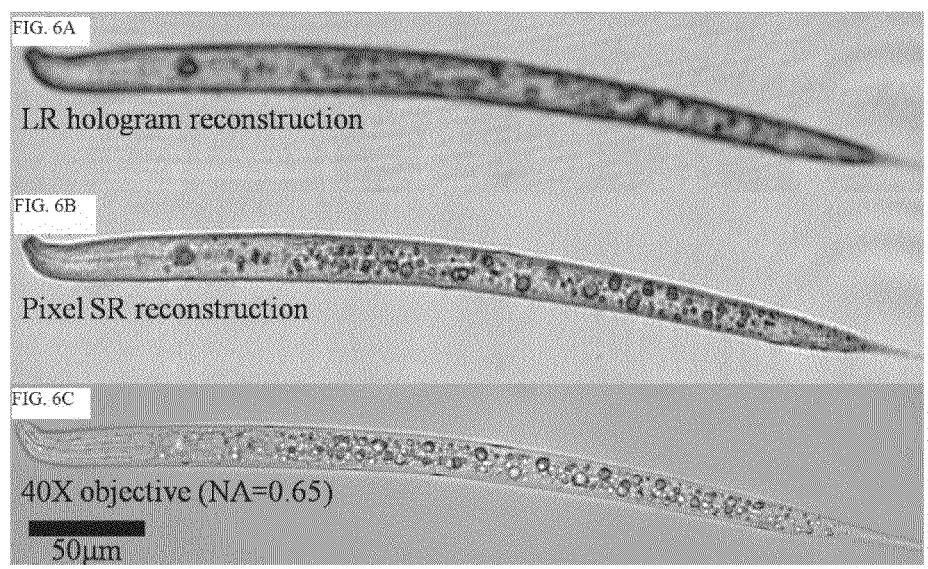

US 8,866,063 B2

LENS-FREE WIDE-FIELD SUPER-RESOLUTION IMAGING DEVICE

RELATED APPLICATION

This application claims priority to U.S. Provisional Patent Application No. 61/470,155, filed on Mar. 31, 2011, which is hereby incorporated by reference in its entirety Priority is claimed pursuant to 35 U.S.C. §119.

STATEMENT REGARDING FEDERALLY SPONSORED RESEARCH OR DEVELOPMENT

This invention was made with government support under grant number N00014-09-1-0858:P00005 awarded by the Office of Naval Research and grant number DP2OD006427 awarded by the National Institute of Health. The government has certain rights in the invention.

FIELD OF THE INVENTION

The field of the invention generally relates to imaging systems and methods and more particularly imaging systems that have particular application in the imaging and analysis of small particles such as cells, organelles, cellular particles and the like.

BACKGROUND

Digital holography has been experiencing a rapid growth over the last several years, together with the availability of cheaper and better digital components as well as more robust and faster reconstruction algorithms, to provide new microscopy modalities that improve various aspects of conventional optical microscopes. Among many other holographic approaches, Digital In-Line Holographic Microscopy (DIHM) provides a simple but robust lens-free imaging approach that can achieve a high spatial resolution with e.g., a numerical aperture (NA) of ~0.5. To achieve such a high numerical aperture in the reconstructed images, conventional DIHM systems utilize a coherent source (e.g., a laser) that is filtered by a small aperture (e.g., <1-2 μm); and typically operate at a fringe magnification of F>5-10, where $F=(z_1+z_2)/z_1$; $z_1$ and $z_2$ define the aperture-to-object and object-to-detector vertical distances, respectively. This relatively large fringe magnification reduces the available imaging field-of-view (FOV) proportional to $F^2$.

In an effort to achieve wide-field on-chip microscopy, the use of unit fringe magnification (F~1) in lens-free in-line digital holography to claim an FOV of ~24 mm² with a spatial resolution of <2 μm and an NA of ~0.1-0.2 has been demonstrated. See Oh C. et al. On-chip differential interference contrast microscopy using lens-less digital holography. Opt Express.; 18(5):4717-4726 (2010) and Isikman et al., Lens-free Cell Holography On a Chip: From Holographic Cell Signatures to Microscopic Reconstruction, Proceedings of IEEE Photonics Society Annual Fall Meeting, pp. 404-405 (2009), both of which are incorporated herein by reference.

This recent work used a spatially incoherent light source that is filtered by an unusually large aperture (~50-100 μm diameter); and unlike most other lens-less in-line holography approaches, the sample plane was placed much closer to the detector chip rather than the aperture plane, i.e., $z_1 \gg z_2$. This unique hologram recording geometry enables the entire active area of the sensor to act as the imaging FOV of the holographic microscope since F~1. More importantly, there is no longer a direct Fourier transform relationship between the sample and the detector planes since the spatial coherence diameter at the object plane is much smaller than the imaging FOV. At the same time, the large aperture of the illumination source is now geometrically de-magnified by a factor that is proportional to $M=z_1/z_2$ which is typically 100-200. Together with a large FOV, these unique features also bring simplification to the set-up since a large aperture (~50 μm) is much easier to couple light to and align.

However, a significant trade-off is made in this recent approach. To wit, the pixel size now starts to be a limiting factor for spatial resolution since the recorded holographic fringes are no longer magnified. Because the object plane is now much closer to the detector plane (e.g., $z_2$~1 mm), the detection NA approaches ~1. However, the finite pixel size at the sensor chip can unfortunately record holographic oscillations corresponding to only an effective NA of ~0.1-0.2, which limits the spatial resolution to <2 μm. While, in principle, a higher spatial density of pixels could be achieved by reducing pixel size at the sensor to e.g., <1 μm, this has obvious technological challenges to use in a large FOV.

SUMMARY

In one aspect of the invention, the limitation due to the pixel size is removed and lens-free holographic reconstruction of microscopic objects on a chip is achieved with a numerical aperture of ~0.5 achieving ~0.6 μm spatial resolution at 600 nm wavelength over an imaging FOV of ~24 mm². This large FOV can scale up without a trade-off in spatial resolution by using a larger format sensor chip because in this scheme the FOV equals to the active area of the detector array. To achieve such a performance jump while still using partially coherent illumination from a large aperture (~50 μm) with unit fringe magnification, multiple lower-resolution (LR) holograms are captured while the aperture (aperture may be replaced with a fiber-optic cable or other optical waveguide) is scanned with a step size of ~0.1 mm.

The knowledge of this scanning step size is not required a priori because the shift is numerically determined without any external input, using solely the recorded raw holograms. This makes the disclosed approach quite convenient and robust as it automatically calibrates itself in each digital reconstruction process. Thus, there is no need for any complicated and expensive encoder devices used to monitor the scanning step. Also, because of the effective demagnification in the hologram recording geometry ($z_1/z_2$>100), such discrete steps in the aperture plane result in sub-pixel shifts of the object holograms at the sensor plane. Therefore, by using a sub-pixel shifting based super-resolution algorithm one can effectively recover much higher resolution digital holograms of the objects that are no longer limited by the finite pixel size at the detector array. Due to the low spatial and temporal coherence of the illumination source, together with its large aperture diameter, speckle noise and the undesired multiple reflection interference effects are also significantly reduced in this approach when compared to conventional high-resolution DIHM systems providing another important advantage.

In one aspect of the invention, a system for imaging objects within a sample includes an image sensor, an illumination source configured to scan in at least two-dimensions relative to the image sensor and illuminate the sample at a plurality of different locations, a sample interposed between the image sensor and the illumination source; and at least one processor configured to reconstruct an image of the sample based on the images obtained from illumination source at the plurality of different scan positions.

In another aspect of the invention, a system for imaging a sample includes an image sensor, one or more illumination sources coupled to an array of optical waveguides, wherein the each optical waveguide of the array terminates at a different spatial location in three dimensional space, and a sample interposed between the image sensor and the one or more illumination sources.

In another embodiment, a system for imaging a sample includes an image sensor, an illumination source comprising an array of light sources that are physically separated from each other in the range of about 0.001 mm to about 500 mm, and a sample interposed between the image sensor and the illumination source.

In still another embodiment, a method of imaging a sample includes illuminating a sample with an illumination source emitting light at a first position through at least one of an aperture or an optical waveguide. A lower resolution image frame of the sample is obtained from an image sensor at the first position. The sample is illuminated with the illumination source at a plurality of additional positions. A plurality of additional lower resolution image frames are obtained at each of the plurality of additional positions. A higher resolution image of the sample is recovered based at least in part on the plurality of lower resolution image frames.

BRIEF DESCRIPTION OF THE DRAWINGS

FIG. 1C is schematic diagram of an imaging configuration according to one embodiment. The aperture-to-object distance $z_1$ is much larger than the object-to-detector distance $z_2$ ($z_1 \sim 10$ cm, $z_2 < 1$ mm). A shift of the aperture causes a de-magnified shift of the object hologram formed at the detector plane, allowing sub-pixel hologram shifting. While FIG. 1A illustrates an aperture undergoing 2D shifting, a fiber-optic cable or waveguide undergoing 2D shift may be substituted for the aperture.

FIG. 1D illustrates the physical pixels captured in a single frame, marked in FIG. 1B by bold borders, superimposed on a high-resolution pixel grid. This frame is shifted a distance of $h_k$ horizontally and $v_k$ vertically with respect to a reference frame.

FIG. 2A illustrates an example of a sub-pixel shifted lower-resolution (LR) hologram of a grating object that has been captured.

FIG. 2B illustrates the sub-pixel shifts (μm) between different holograms that are automatically computed from the raw data using an iterative gradient method. Vertical and horizontal shifts are illustrated in FIG. 2B.

FIG. 2C illustrates a high-resolution or super-resolution (SR) hologram of the object obtained using the Pixel SR algorithm disclosed herein.

FIG. 2D illustrates a magnified portion of the super-resolution (SR) hologram showing high frequency fringes which were not captured in the lower-resolution holograms.

FIG. 3A illustrates a microscope image of the object captured with a 40× objective lens (NA=0.65).

FIG. 3B illustrates the amplitude reconstruction of the object using a single low-resolution hologram.

FIG. 3C illustrates the object amplitude reconstruction using the high-resolution hologram obtained from Pixel SR using 36 LR images.

FIG. 3D illustrates object phase reconstruction obtained from the same high-resolution hologram using Pixel SR. The object phase appears mostly positive due to phase wrapping.

FIG. 3E shows the spatial derivative of the phase profile along the dashed line in pane FIG. 3D. As explained in the text, this spatial derivative operation yields a train of delta functions with alternating signs, broadened by the PSF, which sets the resolution.

FIGS. 4A1 and 4A2 illustrate the amplitude (4A1) and phase (4A2) pixel SR recovery results using 5 holograms.

FIGS. 4B1 and 4B2 illustrate the amplitude (4B1) and phase (4B2) pixel SR recovery results using 12 holograms.

FIGS. 4C1 and 4C2 illustrate the amplitude (4C1) and phase (4C2) pixel SR recovery results using 36 holograms.

FIG. 4D illustrates the sub-pixel shifts of the randomly chosen subsets of LR holograms.

FIG. 4E shows the normalized spatial derivative profiles of the recovered phase images for each case (4A2, 4B2 and 4C2) are shown (5, 12, and 36 holograms).

FIG. 6A illustrates the recovered amplitude image of *C. elegans* from a single LR hologram.

FIG. 6B illustrates the pixel SR image recovered using 16 sub-pixel shifted holograms.

FIG. 6C illustrates the microscope image of the same worm captured with a 40× objective-lens (NA=0.65).

DETAILED DESCRIPTION OF THE ILLUSTRATED EMBODIMENTS

In a general sense, the imaging system and methods described demonstrate the use of a pixel super-resolution approach to digitally claim six (6) fold smaller pixel size for representation of each object hologram to significantly improve the spatial resolution over a large FOV achieving an NA of ~0.5. More specifically, in the inventive method and system the spatial sampling rate of the lens-free holograms is increased which results in an improvement in the spatial resolution by capturing and processing multiple lower-resolution holograms, that are spatially shifted with respect to each other by sub-pixel pitch distances. As an example, if one takes a 5M pixel image sensor that is used to record lens-free digital holograms with a pixel size of ~2.2 μm, the system and method described herein effectively converts this to a 180M pixel image sensor with a six (6) fold smaller pixel size (~0.37 μm) that essentially has the same active area (i.e., the same imaging FOV).

Figure 1A:
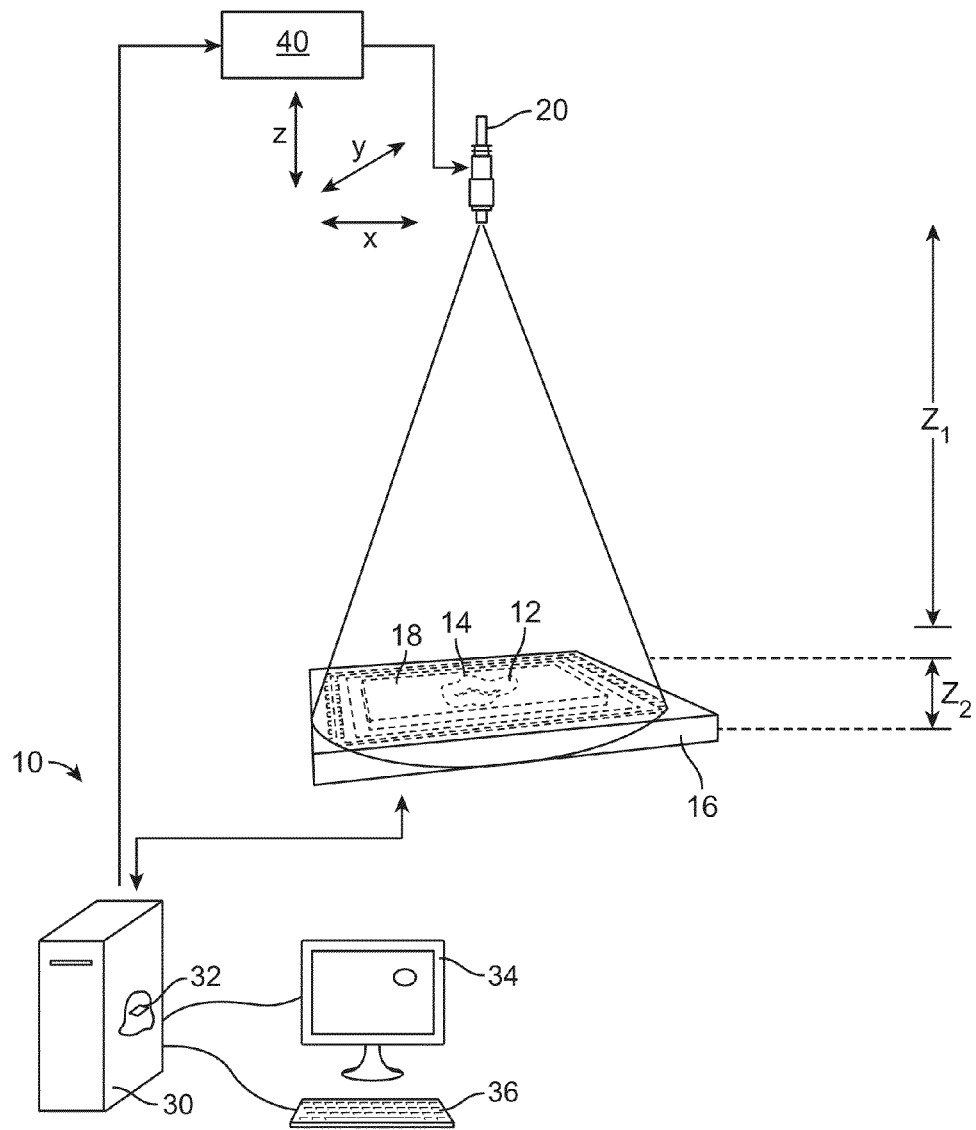
FIG. 1A is a schematic representation of an imaging system according to one embodiment of the invention.
Figure 1B:
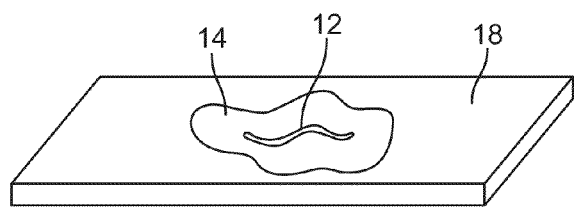
FIG. 1B illustrates a sample containing one or more objects loaded onto a sample holder.

This technique is referred to herein as Pixel Super-Resolution ("Pixel SR"). The idea behind Pixel SR is to use multiple lower-resolution images, which are shifted with respect to each other by fractions of the low-resolution grid constant, to better approximate the image sampling on a higher resolution grid. FIG. 1A illustrates a system 10 for imaging of an object 12 within a sample 14 (best seen in FIG. 1B). The object 12 may include a cell or biological component or constituent (e.g., a cellular organelle or substructure). The object 12 may even include a multicellular organism or the like. Alternatively, the object 12 may be a particle or other object. FIG. 1A illustrates an object 12 to be imaged that is disposed some distance above an image sensor 16. In some embodiments, the sample 14 containing one or more objects 12 is placed directly atop an optically transparent cover or surface of the image sensor 16 (e.g., glass cover) in which case the transparent cover or surface acts as a sample holder 18. The optically transparent cover or surface may even be removed and the sample 14 may be placed directly on the active region or on the chip of the image sensor 16. Alternatively, the sample 14 containing one or more objects 12 is placed on a separate, optically transparent sample holder 18 such as a glass or plastic slide, coverslip, or the like as seen in FIG. 1B.

Regardless, the surface of image sensor 16 may be in contact with or close proximity to the sample 14. Generally, the object 12 within the sample 14 is several millimeters within the active surface of the image sensor 16. The image sensor 16 may include, for example, a charged coupled device (CCD) or a complementary metal-oxide semiconductor (CMOS) device. The image sensor 16 may be monochromatic or color. The image sensor 16 generally has a small pixel size which is less than 9.0 μm in size and more particularly, smaller than 5.0 μm in size (e.g., 2.2 μm or smaller). Generally, image sensors 16 having smaller pixel size will produce higher resolutions. As explained herein, sub-pixel resolution can be obtained by using the method of capturing and processing multiple lower-resolution holograms, that are spatially shifted with respect to each other by sub-pixel pitch distances Still referring to FIG. 1A, the system 10 includes an illumination source 20 that is configured to illuminate a first side (top side as seen in FIG. 1A) of the sample holder 18. The illumination source 20 is preferably a spatially coherent or a partially coherent light source but may also include an incoherent light source. Light emitting diodes (LEDs) are one example of an illumination source 20. LEDs are relative inexpensive, durable, and have generally low power requirements. Of course, other light sources may also be used such as a Xenon lamp with a filter. A light bulb is also an option as the illumination source 20. A coherent beam of light such as a laser may also be used (e.g., laser diode). The illumination source 20 preferably has a spectral bandwidth that is between about 0.1 and about 100 nm, although the spectral bandwidth may be even smaller or larger. Further, the illumination source 20 may include at least partially coherent light having a spatial coherence diameter between about 0.1 to 10,000 μm. The illumination source 20, in some embodiments, may include the display 34 or screen associated with a computer 30 as explained below.

With reference to FIG. 1C, a spatial filter 22 may be optionally interposed between the illumination source 20 and the sample 14 containing the object(s) 12. The spatial filter 22 includes an opaque surface that has an aperture 24 contained therein that is configured to permit the passage of illumination (e.g., spatial aperture or pinhole). The aperture 24 has a diameter (D) that is typically in the range of 50 μm to about 100 μm. Alternatively, the spatial filter 22 may be integrated into the distal end of the illumination source 20 as illustrated in FIG. 1A. For example, the illumination source 20 may be coupled to an optical fiber as seen in FIG. 1A or another optical waveguide. Optical waveguide as used herein refers to optical fibers, fiber-optic cables, integrated chip-scale waveguides and the like. With respect to the optical fiber, the fiber includes an inner core with a higher refractive index than the outer surface so that light is guided therein. In this embodiment, there is no need for a separate opaque surface with an aperture 24. Instead, the optical fiber itself operates as the spatial filter 22. In this embodiment, the core of the optical fiber may have a diameter within the same range the aperture 24 described herein. As seen in FIG. 1A, the distal end (spatial filter 22) of the fiber optic cable illumination source 20 is located at a distance $z_1$ from the sample holder 18 (or sample 14). The imaging plane of the image sensor 16 is located at a distance $z_2$ from the sample holder 18 (or sample 14). In the system 10 described herein, $z_2 \ll z_1$. For example, the distance $z_1$ may be on the order of around 1 cm to around 10 cm. In other embodiments, the range may be smaller, for example, between around 5 cm to around 10 cm. The distance $z_2$ may be on the order of around 0.05 mm to 2 cm, however, in other embodiments this distance $z_2$ may be between around 1 mm to 2 mm. In the system 10, the propagation distance $z_1$ is such that it allows for spatial coherence to develop at the plane of the object 12, and light scattered by the object 12 interferes with background light to form a lens-free in-line hologram on the image sensor 16.

Still referring to FIG. 1A, the system 10 includes a computer 30 such as a laptop, desktop, tablet, mobile communication device, personal digital assistant (PDA) or the like that is operatively connected to the system 10 such that lower resolution images (e.g., lower resolution or raw image frames) are transferred from the image sensor 16 to the computer 30 for data acquisition and image processing. The computer 30 includes one or more processors 32 that, as described herein in more detail, runs or executes software that takes multiple, sub-pixel (low resolution) images taken at different scan positions (e.g., x and y positions) and creates a single, high resolution projection hologram image of the objects 12. The software also digitally reconstructs complex projection images of the objects 12 that includes both amplitude and phase information. Having both the holographic amplitude and recovered phase of the same image, the software then digitally reconstructs three dimensional tomograms of the object(s) 12 through filtered back-propagation of the complex projection images. The reconstructed tomographic images can be displayed to the user on, for example, a display 34 or the like. The user may, for example, interface with the computer 30 via an input device 36 such as a keyboard or mouse to select different tomographic imaging planes.

In an alternative aspect of the invention, the actual display 34 of the computer 30 (e.g., screen or display of portable electronic device) may be used to scan a bright spot in at least two-dimensions relative to the image sensor 16. For example, if the computer 30 is a tablet, phone, or other mobile device, a bright spot acting as a "virtual pinhole" on the display 24 may be scanned in the x and y directions which then illuminates the sample at multiple locations. As explained below, additional scanning in a third dimension (e.g., z direction or angle) may also be used to provide additional image functionality.

Figures 7A, 7B:
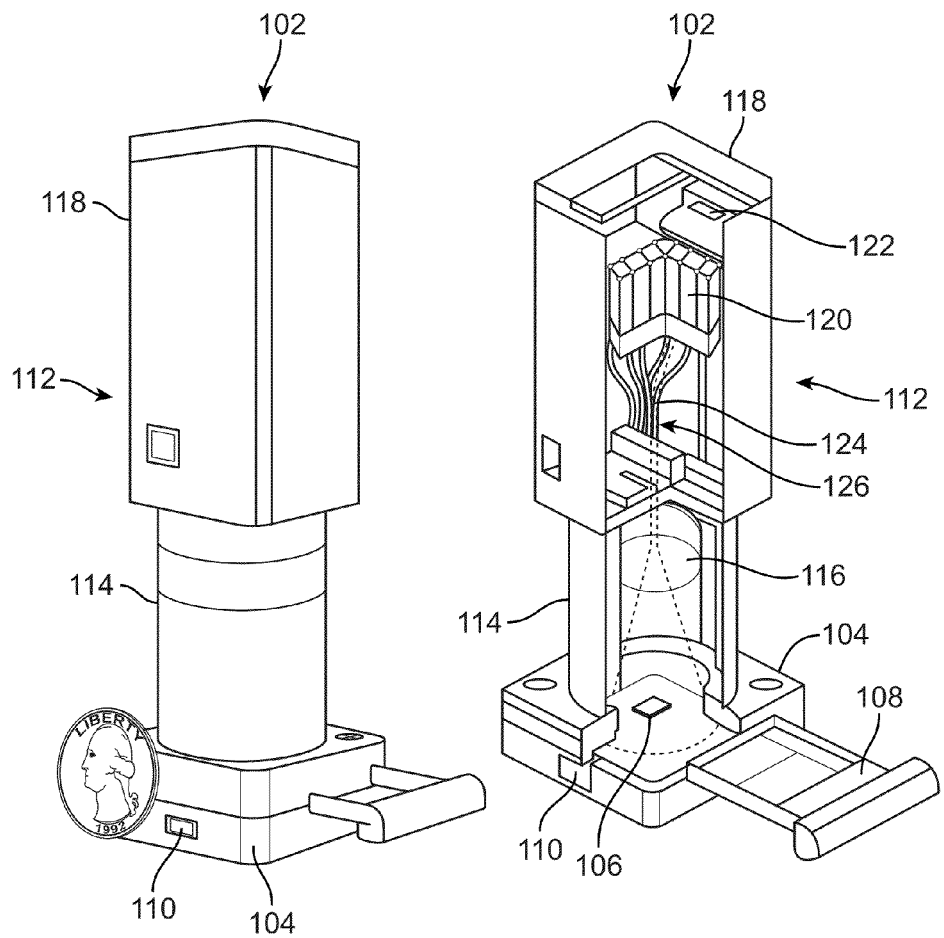
FIG. 7A illustrates a photograph of the lens-free super-resolution microscope (weighing ~95 grams).
FIG. 7B is a partially cut-away, perspective view of the lens-free super-resolution microscope according to one embodiment.

FIG. 1A illustrates generally orthogonal axes in the x and y directions. The x and y directions are generally in a plane parallel with the surface of the image sensor 16. In one aspect of the invention, the illumination source 20 has the ability to move in the x and y directions as indicated by the arrows x and y in FIG. 1A. Any number of mechanical actuators may be used including, for example, a stepper motor, moveable stage, piezoelectric element, or solenoid. FIG. 1A illustrates a moveable stage 40 that is able to move the illumination source 20 in small displacements in both the x and y directions. Preferably, the moveable stage 40 can move in sub-micron increments thereby permitting images to be taken of the objects 12 at slight x and y displacements. The moveable stage 40 may be controlled in an automated (or even manual) manner by the computer 30 or a separate dedicated controller. In one alternative embodiment, the moveable stage 40 may move in three dimensions (x, y, and z or angled relative to image sensor 16), thereby permitting images to be taken of objects 12 at slight x, y, and z/angled displacements. In still an alternative embodiment, as illustrated in FIGS. 7A and 7B, rather than move the illumination source 20 in the x and y directions, a plurality of spaced apart illumination sources can be selectively actuated to achieve the same result without having to physically move the illumination source 20 or image sensor 16.

In this manner, the illumination source 20 is able to make relatively small displacement jogs (e.g., less than about 1 μm). As explained below, the small discrete shifts parallel to the image sensor 16 are used to generate a single, high resolution image (e.g., pixel super-resolution). For example, FIG. 2B illustrates thirty six (36) different low resolution (LR) images in the x-y plane. With reference to FIG. 1C, as an alternative to moving the illumination source 20, the aperture 24 may be moved relative to a stationary illumination source 20. In FIG. 1D, the physical pixels are shown, bordered by thick lines, as well as the virtual higher resolution grid (array of smaller-sized squares). For each horizontal shift $h_k$ and vertical shift $v_k$ of the lower-resolution image, the output of each physical pixel is simply a linear combination of the underlying high-resolution pixel values.

To better formulate Pixel SR, one can denote the lower-resolution (LR) images by $X_k(n_1,n_2)$, k=1, ..., p, each with horizontal and vertical shifts $h_k$ and $v_k$, respectively, and each of size $M=N_1 \times N_2$. The high-resolution (HR) image $Y(n_1,n_2)$ is of the size $N=LN_1 \times LN_2$, where L is a positive integer. The goal of the Pixel SR algorithm is to find the HR image $Y(n_1, n_2)$ which best recovers all the measured frames $X_k(n_1,n_2)$. The metric for the quality of this recovery is described below. For brevity in the notation, all the measured pixels of a captured frame are ordered in a single vector $X_k=[x_{k,1}, x_{k,2}, \ldots, x_{k,M}]$, and all the HR pixels in a vector $Y=[y_1, y_2, \ldots, y_N]$. A given HR image Y implies a set of LR pixel values determined by a weighted super-position of the appropriate HR pixels, such that:

$$\tilde{x}_{k,i} = \sum_{j=1,\ldots,N} W_{k,i,j}(h_k, v_k) \cdot y_j \qquad (1)$$

where $\tilde{x}_{k,i}$ denotes the calculated LR pixel value for a given Y, i=1, ..., M; k=1, ... p and $W_{k,i,j}$ is a physical weighting coefficient. All the frame shifts ($h_k$ and $v_k$) are rounded to the nearest multiple of the HR pixel size. Therefore, a given LR pixel value can be determined from a linear combination of $L^2$ HR pixels. It is further assumed that the weighting coefficients $W_{k,i,j}$ (for a given k and i) are determined by the 2D light sensitivity map of the sensor chip active area and can be approximated by a Gaussian distribution over the area corresponding to the $L^2$ HR pixels.

In the Pixel SR implementation, the high-resolution image (Y) is recovered/reconstructed by minimizing the following cost function, C(Y):

$$C(Y) = \frac{1}{2} \sum_{\substack{k=1,\ldots,p \\ i=1,\ldots,M}} (x_{k,i} - \tilde{x}_{k,i})^2 + \frac{\alpha}{2}(Y_{fil}^T \cdot Y_{fil}) \qquad (2)$$

The first term on the right hand side of Eq. (2) is simply the squared error between the measured low-resolution pixel values and the pixel values recovered from the virtual high-resolution image (see Eq. (1)). Minimizing this term by itself is equivalent to the maximum-likelihood estimation under the assumption of uniform Gaussian noise. This optimization problem is known to be ill-defined and susceptible to high frequency noise. The last term of Eq. (2) is meant to regularize the optimization problem by penalizing high frequency components of the high-resolution image, where $Y_{fil}$ is a high-pass filtration of the high-resolution image Y, and α is the weight given to those high frequencies. For large α, the final high-resolution image would be smoother and more blurred, while for small α the resulting image would contain fine details in addition to high frequency noise. Here, α=1 was used along with a Laplacian kernel for high-pass filtering of Y.

Figure 1E:
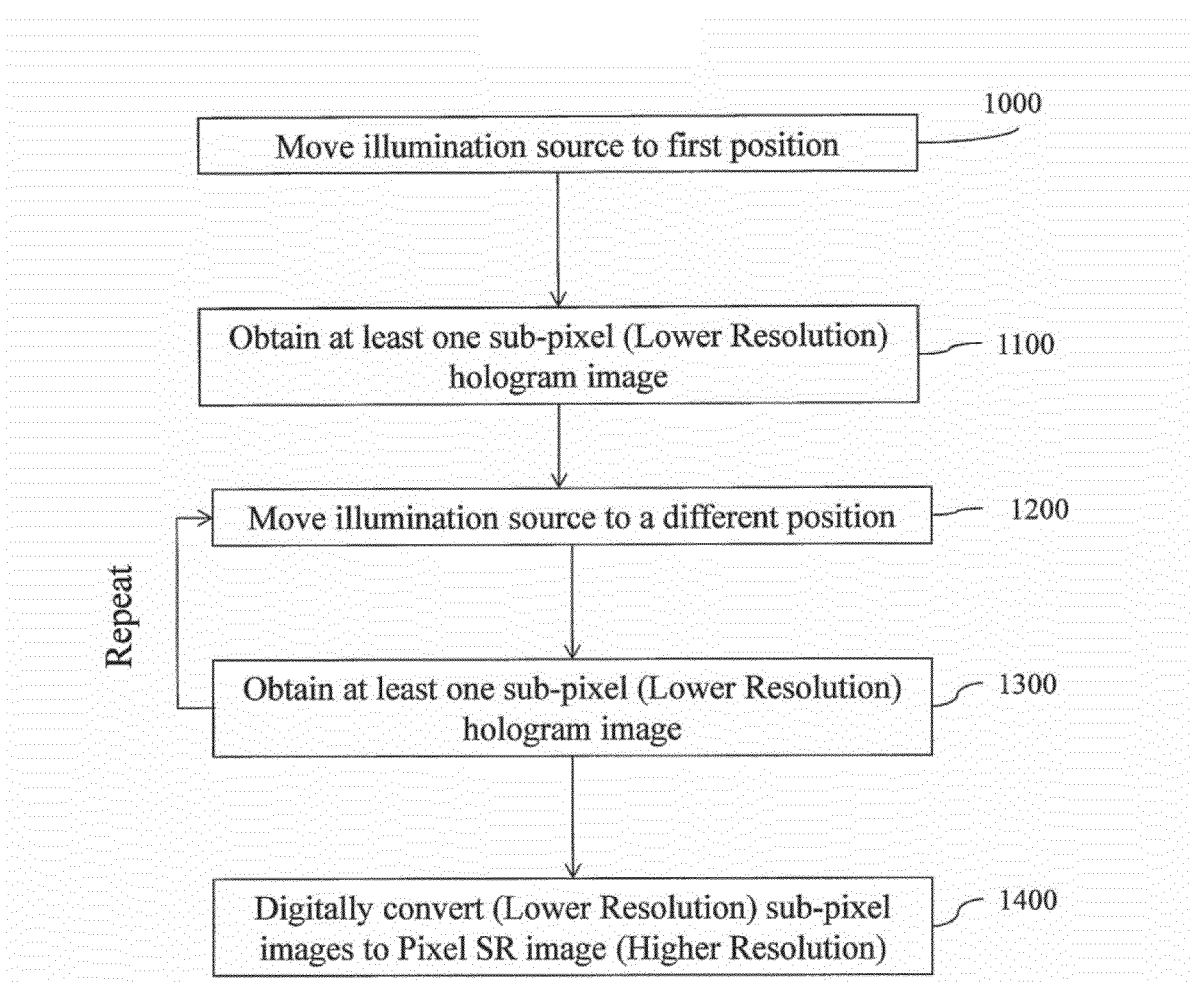
FIG. 1E is a flow chart of the operation of one embodiment of the imaging system.

FIG. 1E illustrates a top-level flowchart of how the system 10 obtains Pixel SR images of objects 12 within a sample 14. After samples 14 are loaded into (or on) the sample holder 18, the illumination source 20 is moved to a first x, y position as seen in operation 1000. The illumination source 10 illuminates the sample 14 and a sub-pixel (LR) hologram image is obtained as seen in operation 1100. Next, as seen in operation 1200, the illumination source 10 is moved to another x, y position. At this different position, the illumination source 10 illuminates the sample 14 and a sub-pixel (LR) hologram image is obtained as seen in operation 1300. The illumination source 20 may then be moved again (as shown by Repeat arrow) to another x, y position where a sub-pixel (LR) hologram is obtained. This process may repeat itself any number of times so that images are obtained at a number of different x, y positions. Generally, movement of the illumination source 10 is done in repeated, incremental movements in the range of about 0.001 mm to about 500 mm.

In operation 1400, the sub-pixel (LR) images at each x, y position are digitally converted to a single, higher resolution Pixel SR image (higher resolution), using a pixel super-resolution technique, the details of which are disclosed in Bishara et al., Lensfree on-chip microscopy over a wide field-of-view using pixel super-resolution, *Optics Express* 18:11181-11191 (2010), which is incorporated by reference. First, the shifts between these holograms are estimated with a local-gradient based iterative algorithm. Once the shifts are estimated, a high resolution grid is iteratively calculated, which is compatible with all the measured shifted holograms. In these iterations, the cost function to minimize is chosen as the mean square error between the down-sampled versions of the high-resolution hologram and the corresponding sub-pixel shifted raw holograms.

In the description given above, the illumination source 20 is moved generally in a plane that is parallel to the image sensor 16. That is to say, the illumination source 20 may move in the x and y directions. The illumination source 20 may be oriented generally normal to the plane of the image sensor 16. However, in other embodiments, the illumination source 20 may be oriented at an angle with respect to the image sensor 16. For example, the angle may range from 0° to 90°. An angled arrangement of the illumination source 20 permits the viewing of different profiles of the objects contained within the sample.

Holograms recorded with oblique illumination angles are still in-line holograms due to co-axial propagation of the scattered object wave and the unperturbed reference wave toward the sensor array. Consequently, digitally reconstructed images are contaminated by the twin-image artifact, which is a manifestation of the fact that the phase of the complex field in the detector plane is lost during the recording process. In order to obtain faithful projection images, a size-constrained iterative phase recovery algorithm is utilized, which enables recovering the phase of the complex field detected by the sensor. Details regarding the phase recover algorithm may be found in Mudanyali et al., Compact, Lightweight and Cost-effective Microscope based on Lensless Incoherent Holography for Telemedicine Applications, *Lab Chip* 10:1417-1428 (2010), which is incorporated by reference as if set forth fully herein.

As will be detailed in the following sections, the experimental setup handles sub-pixel shifting of lens-free holograms and the above described super-resolution hologram recovery algorithm over a large imaging FOV with ease and robustness due to the large demagnification inherent in its recording geometry.

Experimental Setup

A schematic diagram of the experimental setup is shown in FIG. 1C. A spatially incoherent light source (Xenon lamp attached to a monochromator, wavelength: 500-600 nm, spectral bandwidth: ~5 nm) was used that was coupled to an optical fiber with a core size of ~50 µm, which also acts as a large pinhole/aperture. The distance between the fiber end and the object plane ($z_1$~10 cm) is much larger than the distance between the object and the detector planes ($z_2$~0.75 mm). The image sensor is a CMOS sensor with 2.2 µm×2.2 µm pixel size, and a total active area of ~24.4 mm².

The large $z_1/z_2$ ratio, which enables wide-field lens-free holography and the use of a large aperture size, also makes sub-pixel hologram shifting possible without the need for sub-micron resolution mechanical movement. In other words, the requirements on the precision and accuracy of the mechanical scanning stage (or other means of moving illumination source) are greatly reduced in this system and method. Geometrical optics approximations show that the object hologram at the detector plane can be shifted sub-pixel by translating the illumination aperture parallel to the detector plane. The ratio between the shift of the hologram at the detector plane and the shift of the aperture can be approximated as:

$$\frac{S_{hologram}}{S_{aperture}} = \frac{z_2}{z_1} \times \frac{n_1}{n_2}, \quad (3)$$

where $n_1$=1 is the refractive index of air, and $n_2$=1.5 is the refractive index of the cover glass before the detector array. For $z_1$=10 cm and $z_2$=0.75 mm, the ratio between these two shifts become $S_{hologram}/S_{aperture}$~1/200, which implies that to achieve e.g., 0.5 µm shift of the object hologram at the detector plane, the source aperture can be shifted by 200×0.5=100 µm. In the experiments reported herein, an automated mechanical-scanning stage was used to shift the fiber aperture; and captured multiple holograms of the same objects with sub pixel hologram shifts. In an alternative embodiment, as described below, multiple illumination sources separated by ~0.1 mm from each other that can be switched on-off sequentially could also be used to avoid mechanical scanning.

Using Eq. (3), the required aperture shift for a desired sub-pixel hologram shift can be calculated. Because the parameters in Eq. (3) may not be exactly known, and as a consistency check, the hologram shifts were independently computed directly from the captured lower-resolution holograms, using an iterative gradient algorithm such as that disclosed in Hardie et al., "Joint map registration and high-resolution image estimation using a sequence of under sampled images," IEEE Transactions in Image Processing 6(12), 1621-1633 (1997), which is incorporated herein by reference. Therefore, the hologram shifts to be used in Eq. (2) and Eq. (3) are computed from the raw data, and are not externally input, which makes this approach quite convenient and robust as it automatically calibrates itself in each digital reconstruction process, without relying on the precision or accuracy of the mechanical scanning stage.

Experimental Results

To quantify the spatial resolution improvement due to Pixel SR, a calibration object was fabricated consisting of 1 µm wide lines etched into a glass cover slide (using focused ion beam milling), with 1 µm separation between the lines (see FIG. 3A). This object is a finite size grating, and ideally it is a phase-only object, except the scattering at the walls of the etched regions. Initially, experiments used L=6, i.e., the object holograms were shifted by one sixth of a pixel in each direction, for a total of thirty-six 36 lens-free holograms. FIG. 2A shows one of these LR holograms captured at the image sensor. The sub-pixel shift amount of each LR hologram with respect to the first LR hologram is calculated from the raw data without any additional input as shown in FIG. 2B. The super-resolution hologram (FIG. 2C) is generated by minimizing Eq. (2) using the Conjugate Gradient method, incorporating all the captured 36 LR holograms. See D. G. Luenberger, *Linear and Nonlinear Programming* (Addison-Wesley, 1984), which is incorporated by reference. It is evident that the computed high-resolution hologram now captures the interference fringes which could not be normally recorded with a 2.2 μm pixel size.

The super-resolution hologram also translates to a high-resolution object reconstruction. Given a lens-free hologram, whether a lower-resolution holograms or a super-resolution hologram the image of the object can be reconstructed, in both amplitude and phase, using an iterative, object-support constrained, phase recovery algorithm. Details regarding the pixel super-resolution technique are disclosed in Bishara et al., Lensfree on-chip microscopy over a wide field-of-view using pixel super-resolution, *Optics Express* 18:11181-11191 (2010) and Bishara et al., Holographic pixel super-resolution in portable lensless on-chip microscopy using a fiber-optic array, Lab on a Chip 11, 1276-1279 (2011), which are incorporated by reference. First, the shifts between these holograms are estimated with a local-gradient based iterative algorithm. Once the shifts are estimated, a high resolution grid is iteratively calculated, which is compatible with all the measured shifted holograms. In these iterations, the cost function to minimize is chosen as the mean square error between the down-sampled versions of the high-resolution hologram and the corresponding sub-pixel shifted raw holograms.

FIG. 3B illustrates the amplitude image that was obtained using a single lower-resolution hologram (shown in FIG. 2A). The inner features of the object are lost, which is expected due to the limited NA of the raw hologram (i.e., <0.2). Compare this, however, with FIGS. 3C and 3D which illustrate the amplitude and the phase images, respectively, recovered from the high-resolution hologram obtained from the Pixel SR algorithm (seen in FIG. 2C). With the SR hologram, fine features of the object are clearly visible, and the object distinctly resembles the 40× microscope image shown in FIG. 3A.

The grating object was made from indentations filled with air in glass, and therefore should have a negative phase. At the wavelength used in recording the raw holograms (e.g., 600 nm), the object has a phase that is greater than π. This leads to phase wrapping, and the object's recovered phase appears to be mostly positive. Assuming that this grating object was fabricated with a rather fine resolution (which is a valid assumption since focused ion beam milling was used with a spot size of <50 nm), in an ideal image reconstruction, the phase jumps on each line's edges would be infinitely sharp and impossible to unwrap. Therefore, one can use the reconstructed phase image at the edges of the fabricated lines to quantify the resolution limit of the Pixel SR method. Note that the recovered phase profile of the grating in a direction perpendicular to the lines, e.g., the dashed line in FIG. 3D, should have sharp jumps with alternating signs. As a result, the spatial derivative of such a profile would consist of delta function with alternating signs. The limited spatial resolution would broaden these delta functions by the point spread function (PSF). Therefore, if one examines the spatial derivative of the phase profile of the images, one would expect to see a series of the PSF with alternating signs. FIG. 3E shows the spatial derivative of the phase profile along the dashed line indicated in FIG. 3D, interpolated for smoothness. The 1/e width of all the peaks shown in FIG. 3E is ≤0.6 μm, which leads to the conclusion that our resolution is ~0.6 μm with an NA of ~0.5.

It should be noted that a similar performance could also be achieved with much less than thirty-six (36) lower-resolution holograms. The pixel SR algorithm that has been implemented is an optimization algorithm, which may also work for underdetermined data sets, i.e., it can attempt to optimize the cost function (Eq. 2) to recover the best high-resolution hologram (with the same grid size) using less than $L^2=36$ LR holograms. FIGS. 4A1, 4A2, 4B1, 4B2, 4C1, 4C2 illustrate amplitude and phase images of the reconstructed high-resolution object images obtained by processing 5, 12, and 36 LR holograms. These LR holograms were selected from the full set of 36 sub-pixel shifted holograms as shown in FIG. 4D. The randomness of this selection process was slightly constricted by enforcing that each sub-set of holograms used by the Pixel SR algorithm would contain both the least shifted and the maximum shifted one in order to have well aligned images for accurate comparison. The super-resolution algorithm would perform equally well with complete randomness, but the comparison between different cases would then be less educative. As illustrated in FIGS. 4A1, 4A2, 4B1, 4B2, 4C1, 4C2, the reconstructed HR images are qualitatively the same for different numbers of LR holograms used, though the contrast is enhanced and the distortions are reduced as more LR holograms are used. Thus, in one aspect of the invention, a higher resolution image can be obtained with less than five hundred (500) lower resolution frames. In still another aspect, a higher resolution image can be obtained with less than forty (40) lower resolution image frames. In another aspect, even fewer lower resolution frames are needed. For instance, fewer than five (5) lower resolution image frames may be needed to reconstruct a high resolution image.

FIG. 4E illustrates a graph of the spatial derivative of the recovered phase images perpendicular to the grating lines. The width of the derivative peaks (indicative of the spatial resolution in each recovery) and does not appear to differ much as fewer number of LR holograms are used, which is quite encouraging since it implies that a small number of LR holograms, with random shifts, can be assigned to an appropriate HR grid to permit high-resolution lens-free image recovery over a large FOV. This should allow for great flexibility in the physical shifting and hologram acquisition process.

Figure 5A:
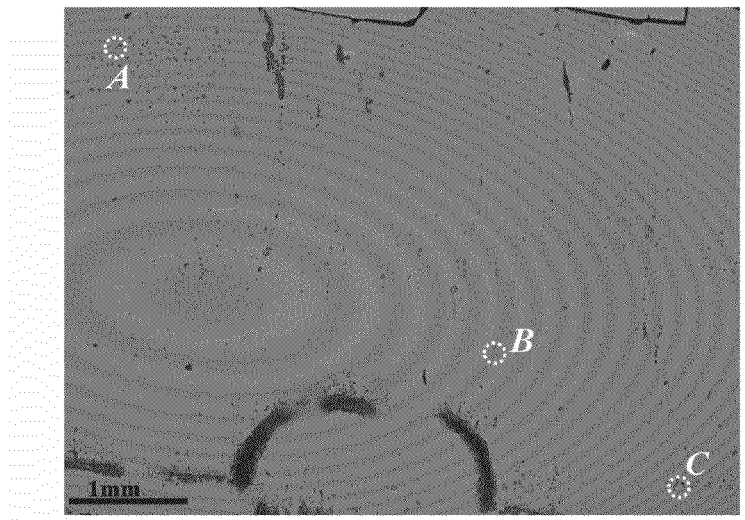
FIG. 5A illustrates a wide-field (FOV~24 mm$^2$) high-resolution imaging of a whole blood smear sample using Pixel SR.
Figure 5B:
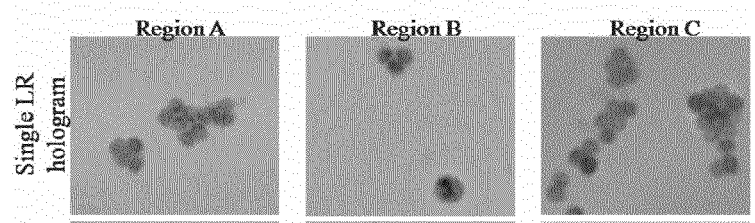
FIG. 5B illustrates regions A, B, and C of FIG. 5A recovered using a single LR hologram (NA<0.2).
Figure 5C:
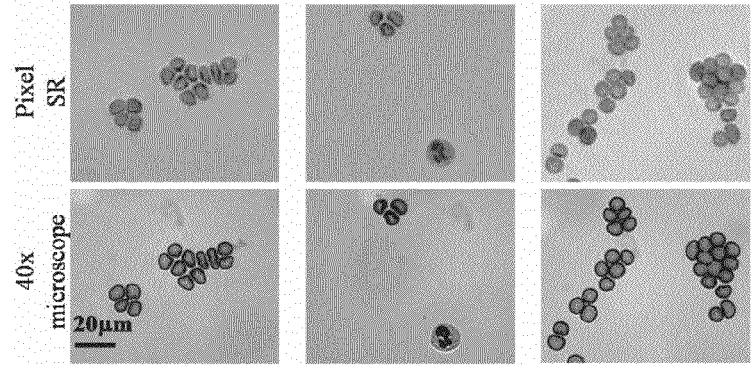
FIG. 5C illustrates regions A, B, and C of FIG. 5A recovered using Pixel SR (NA~0.5). Regions A and C show red blood cell clusters that are difficult to resolve using a single LR hologram, which are now clearly resolved using Pixel SR. In region B the sub-cellular features of a white blood cell are also resolved.
Figure 5D:
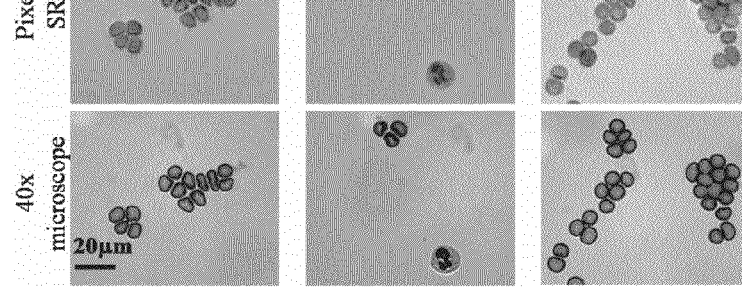
FIG. 5D illustrates regions A, B, and C of FIG. 5A imaged with a 40× microscope (NA=0.65).

Next, to demonstrate the wide-field imaging capability of the system, the Pixel SR scheme was applied to image a whole blood smear sample. In this experiment, a blood smear was created by smearing a droplet of whole blood on a cover glass to form a single layer of cells. The entire field-of-view (~24 mm$^2$) is shown in FIG. 5A. A source wavelength of λ=500 nm was used and the system captured thirty-six (36) sub-pixel shifted holograms. Different regions of the field-of-view are digitally cropped (Regions A, B and C) to show the image improvement due to Pixel SR. FIG. 5B illustrate Regions A, B, and C reconstructed using a single LR hologram. The FIG. 5C images were obtained from processing thirty-six 36 sub-pixel shifted holograms using the Pixel SR method. The images in FIG. 5D are obtained with a 40× microscope objective (0.65 NA) for comparison purposes. As seen in FIGS. 5C and 5A, it is clear that Pixel SR allows resolving cell clusters which would be difficult to resolve from processing a single LR hologram. Also, the sub-cellular features of white blood cells are visibly enhanced as shown in FIG. 5C (Region B).

FIG. 6A illustrates the recovered amplitude image of *Caenorhabditis elegans* (*C. elegans*) from a single LR hologram.

FIG. 6B illustrates the pixel SR image recovered using 16 sub-pixel shifted LR holograms captured at an illumination wavelength of $\lambda=500$ nm. FIG. 6C illustrates the microscope image of the same worm captured with a 40× objective-lens (NA=0.65). Once again, the resolution improvement due to Pixel SR is clearly visible in FIG. 6B. The imaging system has a poorer axial resolution than a 40× microscope objective (NA=0.65), and therefore compared to the microscope image, the Pixel SR image effectively shows a thicker z-slice of the *C. elegans* 3D body, which is almost a cylinder of ~25 μm diameter.

In another embodiment, a system 100 is disclosed that uses a lens-less, on-chip microscope 102 that can achieve <1 μm resolution over a wide field-of-view of ~24 mm² which is >50× larger than a conventional microscope. This compact lens-less, on-chip microscope 102 weighs ~95 grams and is based on partially-coherent digital in-line holography. The microscope 102 includes a base 104 that includes an image sensor 106 that may take the form of a CMOS or CCD chip. The base 104 includes a sample tray 108 that is moveable into and out of the base 104. For example, the sample tray 108 is moveable out of the base 104 to load a slide, slip or other sample holder into the same. The sample tray 108 can then be placed closed, whereby the slide, slip, or other sample holder containing the sample is placed atop the image sensor 106. The base 104 also includes an interface 110 that can function both for power as well as data transmission. For example, the interface 110 may include a standard USB interface. The USB interface 110 can provide power to both the image sensor 106 as well as the illumination sources 120 discussed below.

Figures 7C, 7D:
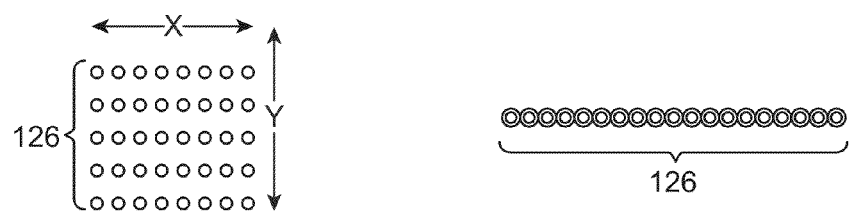
FIG. 7C illustrates an end view of an array of optical fibers or waveguides according to one embodiment.
FIG. 7D illustrates an end view of an array of optical fibers or waveguides according to another embodiment.

The microscope 102 includes an elongate portion 112 extending from the base 104. The elongate portion 112 includes a stand-off 114 that includes a hollow, interior portion through which light passes toward the sample positioned above the image sensor 106. The stand-off may be a tubular member as illustrated in FIGS. 7A and 7B. An optional color filter 116 may be positioned in the stand-off 114 as illustrated in FIG. 7B. The stand-off 114 aids in providing the separation distance $z_1$ (FIG. 1A) between the sample and the illumination source. A housing 118 forms part of the elongate portion 112 and includes therein a plurality of illumination sources 120. The illumination sources 120 may include light emitting diodes (LEDs), laser diodes, or the like. A processor 122 is operatively coupled directly or indirectly to the illumination sources 120 to selectively actuate individual illumination sources 120. Each illumination source 120 is coupled to an optical fiber 124 or other waveguide that terminates into an illumination array 126 that provides for different illumination locations (i.e., different x and/or y locations). In this regard, rather than have a moving illumination source that is driven via a mechanical stage or other moving component, a series of fibers that are stationary yet places at different locations relative to the image sensor 106 can be used to effectively provide this sub-pixel shift. While FIG. 7C illustrates a two-dimensional array 126 it should be understood that the array may only include a single dimensional array 126 (i.e., only fibers in the x direction or fibers in the y direction) as illustrated in FIG. 7D. In either embodiment of the array 126, adjacent optical fibers or waveguides are separated from one another by a distance within the range of about 0.001 mm to about 500 mm.

In the tested embodiment, multiple fiber-optic waveguides 124 are butt-coupled to light emitting diodes 120, which are controlled by a low-cost micro-controller 122 to sequentially illuminate the sample. The resulting lens-free holograms are then captured by a digital image sensor 106 and are rapidly processed using a pixel super-resolution algorithm to generate much higher resolution holographic images (both phase and amplitude) of the objects. This wide-field and high-resolution on-chip microscope, being compact and light-weight, would be important for global health problems such as diagnosis of infectious diseases in remote locations. The performance of this field-portable microscope has been validated and tested by imaging human malaria parasites (*Plasmodium falciparum*) in thin blood smears.

FIGS. 7A and 7B illustrate holographic lens-less microscope 102 which achieves a wide field-of-view (FOV) of ~24 mm² together with a resolution of <1 μm. At the heart of this field-portable microscope 102 lies an array of twenty-three (23) multi-mode fiber-optic waveguides 124, arranged along a line with no gaps in between. Every fiber 124 in this array is butt-coupled to an individual light-emitting diode (LED) 120 without the use of any coupling optics or lenses. Using a low-cost digital micro-processor 122, these twenty-three (23) LEDs are sequentially turned on such that the sample is illuminated by a single fiber 124 at a given moment in time, creating lens-free transmission holograms of the objects at the sensor-array. With each individual fiber illumination, a different lens-free hologram that is shifted with respect to others is acquired, and this permits us to utilize the pixel super-resolution algorithm to create a much higher resolution hologram of the same scene without trading off the wide FOV. This compact microscopy platform weighing only ~95 grams can achieve <1 μm resolution over 24 mm² FOV (without the use of any mechanical scanning or optical components such as lenses), which is >50 fold larger than the FOV of an objective-lens with comparable resolution. Another important feature of this lens-free microscope 102 is that since it utilizes large core fiber-optic cables 124 with a diameter of >0.1 mm, there is no major alignment requirement in its architecture making it quite robust and easy to use. Further, because of the holographic nature of image formation, one can reconstruct both amplitude and phase images of the objects, where the latter can especially be of use for better visualization of weakly scattering objects such as parasites or pathogens. To demonstrate the performance of this lens-less holographic super-resolution microscope, micro-structures patterned on glass were imaged along with malaria parasites (*Plasmodium falciparum*) in standard smears of infected human red blood cells.

Figure 1F:
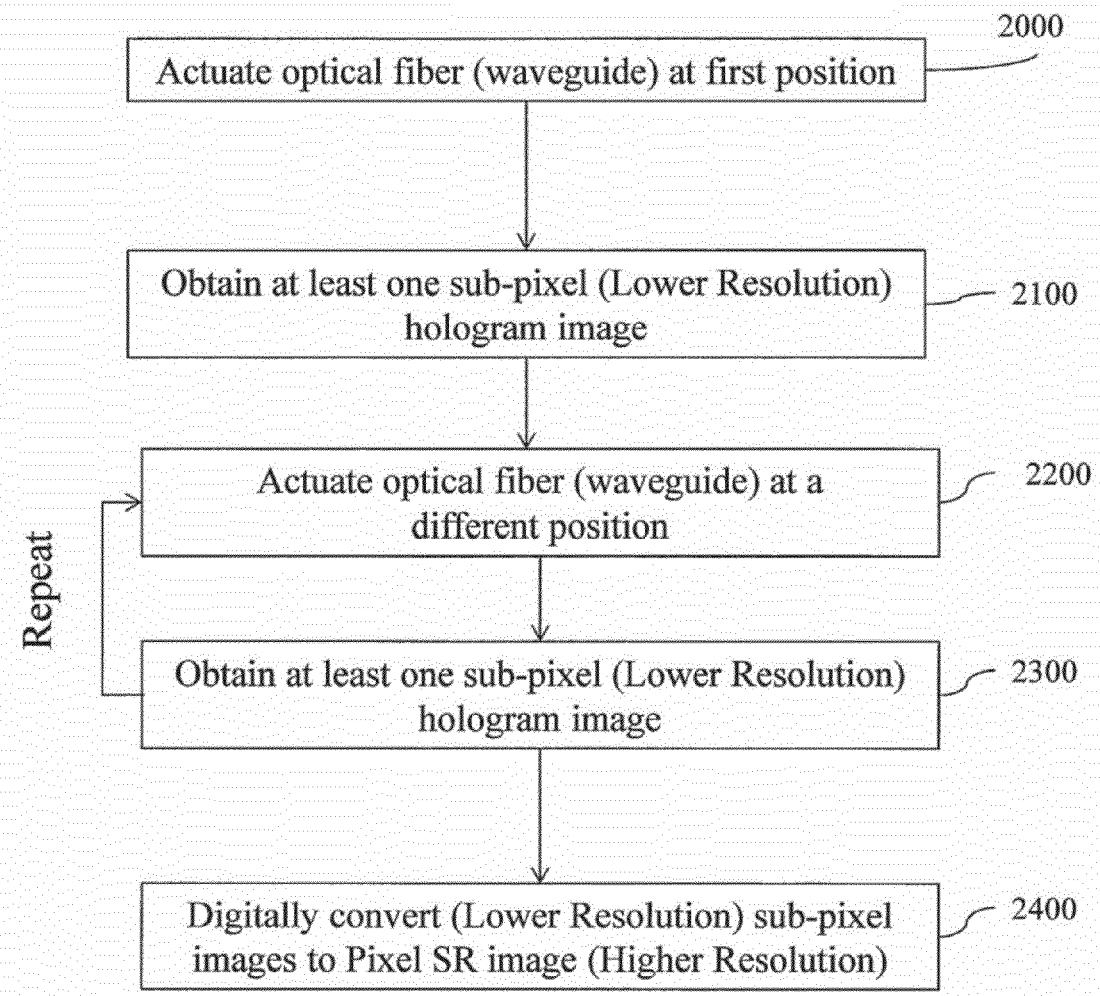
FIG. 1F is a flow chart of the operation of another embodiment of the imaging system.

FIG. 1F illustrates a top-level flowchart of how the alternative embodiment using the holographic lens-less microscope 102 obtains Pixel SR images of objects 12 within a sample 14. After samples 14 are loaded into (or on) the sample holder 108, one of the illumination sources 120 (e.g., LED) coupled to one of the optical fibers 124 of the array 126 is actuated as seen in operation 2000. The actuated illumination source 120 thus corresponds to a particular geographic illumination location. The illumination source 120 illuminates the sample 14 and a sub-pixel (LR) hologram image is obtained as seen in operation 2100. Next, as seen in operation 2200, another illumination source 120 that is coupled to a different optical fiber 124 of the array 126 is actuated. At this different position, the illumination source 120 illuminates the sample 14 and a sub-pixel (LR) hologram image is obtained as seen in operation 2300. A different illumination source 120 may then be actuated (as shown by Repeat arrow) which illuminates the sample 14 from a different position where a sub-pixel (LR) hologram is obtained. This process may repeat itself any number of times so that images are obtained at a number of different x, y positions. Generally, movement of the illumination source 10 is done in repeated, incremental movements in the range of about 0.001 mm to about 500 mm. For example, each adjacent optical fiber 124 may be separated from other adjacent fibers by a distance within the aforementioned range. In operation 2400, the sub-pixel (LR) images at each x, y position are digitally converted to a single, higher resolution Pixel SR image (higher resolution), using a pixel super-resolution technique, the details of which are disclosed in Bishara et al., Lensfree on-chip microscopy over a wide field-of-view using pixel super-resolution, *Optics Express* 18:11181-11191 (2010), which is incorporated by reference.

A schematic diagram of the tested lens-less holographic microscope 102 is illustrated in FIG. 7B, together with a photograph of the prototype shown in FIG. 7A. In the lens-less microscope architecture, each LED (OSRAM TOPLED SuperRed, 633 nm) is butt-coupled to an individual multi-mode fiber-optic waveguide with a core diameter of 105 µm, i.e., the free end of each fiber acts as a large pinhole through which the sample is illuminated. The bandwidth of each LED is ~15-20 nm, but it is filtered down to ~10 nm using a simple color filter 116 as seen in FIG. 7B which relatively increases the temporal coherence of the source to claim a numerical aperture of ~0.4-0.5. The object slide to be imaged (e.g., a blood smear) is placed directly atop the protective glass of the image sensor, ~0.7 mm from the active area of the sensor chip (Aptina MT9P031I12STM; Complementary metal-oxide-semiconductor—CMOS), and a distance of 3-6 cm away from the fiber-optic cables. The free ends of all these twenty-three (23) fiber-optic waveguides are bundled together in the form of a line as seen in FIG. 7D with no gaps in between. Using a simple and cost-effective micro-controller (Atmel ATmega8515) each one of the LEDs is sequentially turned on, and a lens-free holographic image is captured by the sensor with a short exposure time of ~30 ms per image. As the partially-coherent LED light from the fiber-end propagates toward the sample, it develops a sufficiently large spatial coherence diameter such that the scattered light from each micro-object can coherently interfere with the unperturbed portion of the illumination, forming a holographic interference pattern on the CMOS sensor. A typical example of such a lens-free hologram acquired with a single LED illumination is shown in FIG. 8A.

As different LEDs (each of which is butt-coupled to a specific fiber within the linear array) are sequentially turned on and off, shifted versions of the same hologram are sampled at the CMOS sensor-array. These hologram shifts at the detector plane are around two orders of magnitude smaller than the physical distances between the centers of the fiber-ends. More importantly, no prior information of these lateral distances or shift amounts is required as they can be numerically estimated from the acquired series of lens-free holograms. In addition, these lateral shifts do not need to be regularly spaced in x-y plane, and actually can be randomly placed, making the performance of this microscope quite robust and insensitive to potential mechanical misalignments during the lifetime of the instrument. In this holographic pixel super-resolution approach, integer pixel shifts between different holograms do not offer additional information and are digitally removed. Sub-pixel shifts, on the other hand, allow reconstruction of high-frequency fringes, after appropriate processing, which are normally under sampled in a single raw hologram as illustrated in FIG. 8A. The integer pixel shifts to be removed are calculated by cross correlation of raw lens-free holograms, and the remaining sub-pixel shifts are then calculated by an iterative gradient based shift estimation method. Details regarding the phase recover algorithm may be found in Mudanyali et al., Compact, Light-weight and Cost-effective Microscope based on Lensless Incoherent Holography for Telemedicine Applications, *Lab Chip* 10:1417-1428 (2010), which is incorporated by reference as if set forth fully herein.

Figures 8A, 8B, 8C:
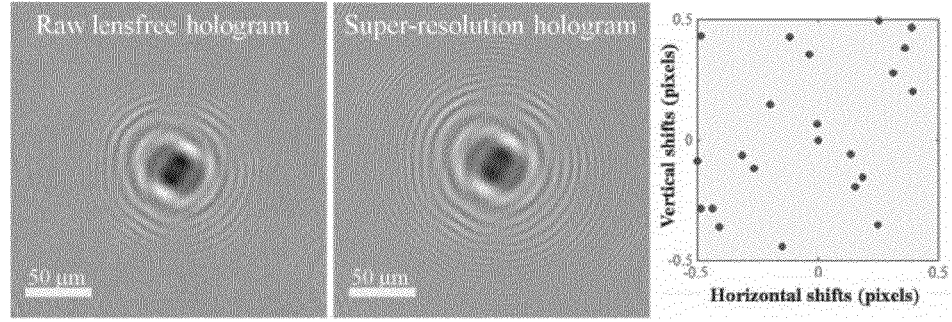
FIG. 8A illustrates a raw lens-free hologram captured by the sensor-array and is under sampled due to relatively large pixel size (~2.2 μm) at the sensor chip.
FIG. 8B illustrates a super-resolution (SR) hologram after multiple shifted lens-free holograms are processed through the pixel super-resolution algorithm to generate a much higher resolution hologram where spatial aliasing is resolved.
FIG. 8C illustrates sub-pixel shift amounts between different frames. Note that no prior information of the lateral shift amounts is required as they can be numerically estimated from the acquired series of lens-free holograms.

These multiple sub-pixel shifted holograms are then input to a pixel super-resolution algorithm, which creates a single high-resolution hologram as illustrated in FIG. 8B, resolving higher spatial frequency oscillations that do not exist in the raw lens-free holograms. See Bishara et al., Lensfree on-chip microscopy over a wide field-of-view using pixel super-resolution, *Optics Express* 18:11181-11191 (2010) and Bishara et al., Holographic pixel super-resolution in portable lensless on-chip microscopy using a fiber-optic array, Lab on a Chip 11, 1276-1279 (2011). This computation involves iterative optimization of a cost-function that is defined by the square of the absolute error between the target super-resolved hologram and the measured raw lens-free holograms. This cost-function also includes a regularization term which penalizes higher frequencies to avoid potential artifacts in the reconstructed images. Additional details regarding this may be found in *Optics Express* 18:11181-11191 (2010) identified above.

Figures 9A, 9B, 9C, 9D:
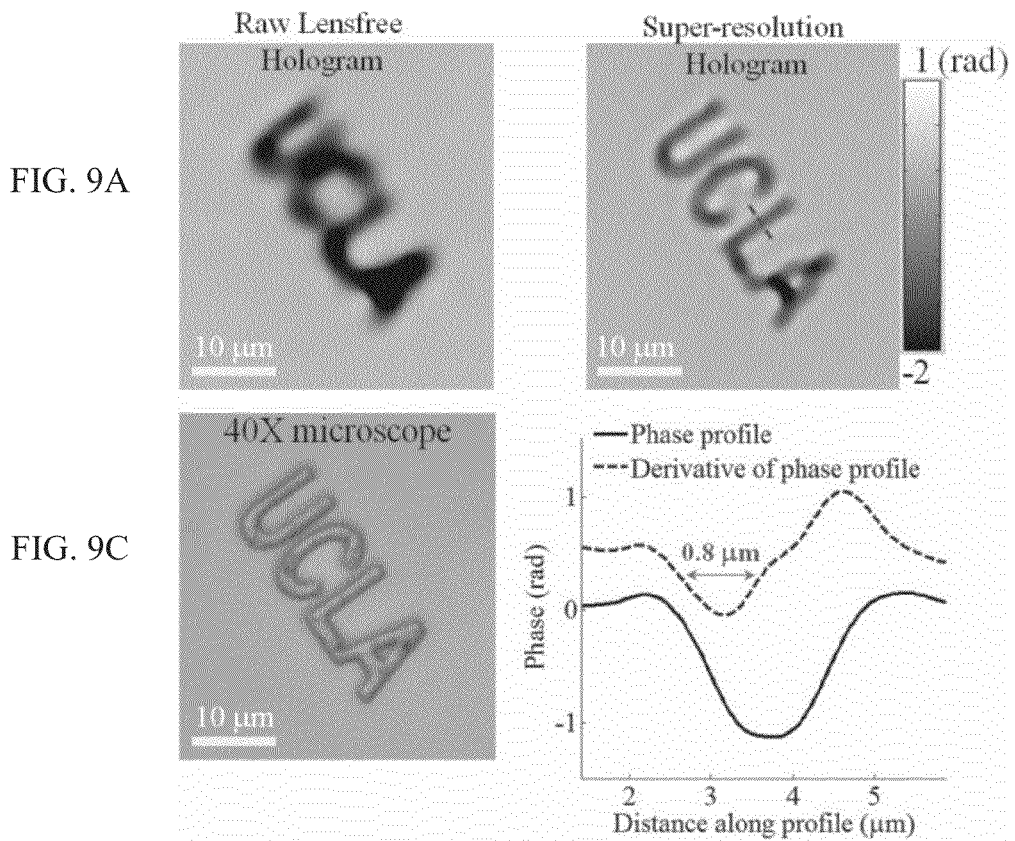
FIG. 9A illustrates a raw lens-free hologram image of a micro-pattern of "UCLA" etched in glass.
FIG. 9B illustrates the super-resolution (SR) hologram after multiple shifted lens-free holograms were processed through the pixel super-resolution algorithm to generate a much higher resolution hologram where spatial aliasing is resolved. The spacing between the letters "U" and "C" in this etched pattern is 1 μm, and the two letters are clearly resolved using the super-resolution microscope further supporting sub-micron resolution.
FIG. 9C illustrates a 40× bright-field microscope image of the same "UCLA" pattern.
FIG. 9D illustrates a cross section of the phase image across the letter "L" and its 1D spatial derivative demonstrate the resolution to be <1 μm.

To investigate the performance of the holographic super-resolution microscope, micro-patterns etched on a glass slide using Focused Ion Beam (FIB) milling were imaged. Ideally, these etched patterns are phase-only objects with an optical phase that is proportional to the etching depth. For this micro-pattern, FIG. 8A illustrates a raw lens-free hologram and its super-resolved version (FIG. 8B) that is obtained using our super-resolution microscope shown in FIGS. 7A and 7B. For the same object, FIG. 9C compares the phase images that are reconstructed by processing this super-resolution hologram as well as a single raw lens-free hologram of FIG. 9A, which clearly illustrates the higher resolving power of our super-resolution microscope compared to a single hologram. FIG. 9C illustrates a 40× bright-field microscope image of the same "UCLA" pattern. The recovered phase images in both cases are negative, as expected from a pattern etched in glass. This digital reconstruction step involves an iterative object-support constrained phase recovery algorithm which effectively removes the twin image artifact of in-line holography and allows the recovery of the object image (both amplitude and phase) taking typically ~10-15 iterations (<1 sec) to converge using e.g., a graphics processing unit (GPU). Additional details regarding digital reconstruction and removal of artifacts may be found in PCT Application No. PCT/US2011/064701, filed on Dec. 13, 2011, which is incorporated herein by reference. The spacing between the letters U and C in this etched pattern is 1 µm, and the two letters are clearly resolved using our super-resolution microscope indicating sub-micron resolution. To further quantify this, the recovered phase profile across the letter L is plotted and its 1D spatial derivative, which is an indicator of the "edge-response" of the microscope. As illustrated in FIG. 9D, the full-width-half-maximum (FWHM) of this phase derivative profile is ~0.8 µm, which further supports that our resolution is sub-micron.

The portable lens-free microscope presented here is aimed toward field-use for disease diagnostics, blood tests, water quality tracking, and other applications where optical microscopy is commonly used. For these tasks, a wide FOV becomes highly desirable for rapidly screening large sample volumes for e.g., detection of characteristic signatures of a parasite. In the case of detection of malaria in blood smears and for determining the percentage of infected red blood cells, several different fields-of-view of a typical bright-field microscope must be examined to overcome statistical fluctuations. The disclosed holographic super-resolution microscope presented here has an FOV of ~24 $mm^2$, which is >150 fold larger than a typical 40× bright-field microscope FOV and therefore a single microscope image with such a wide FOV would be sufficient for the same purpose. In addition, the digital nature of this holographic microscope (with phase and amplitude images) could possibly permit automation of malaria diagnosis by processing the acquired lens-free images.

Figure 10A:
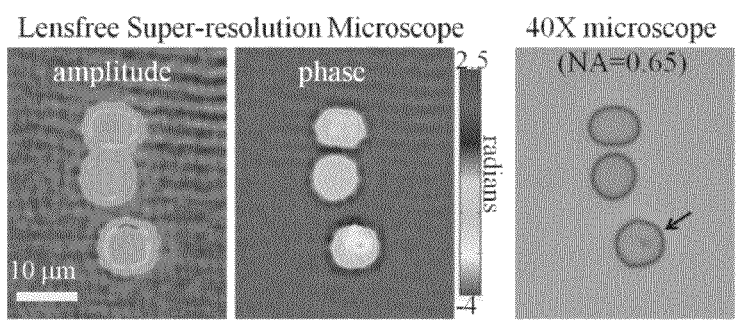
FIGS. 10A-10C illustrates lens-free super-resolution (SR) images (both amplitude and phase) of red blood cells infected with malaria parasites (*Plasmodium falciparum*) in a standard thin blood smear. The parasites are clearly visible in both amplitude and phase images. 40× objective (NA=0.65) bright-field microscope images of the same samples are also provided for comparison purposes, where the infected cells are marked with an arrow.
Figure 10B:
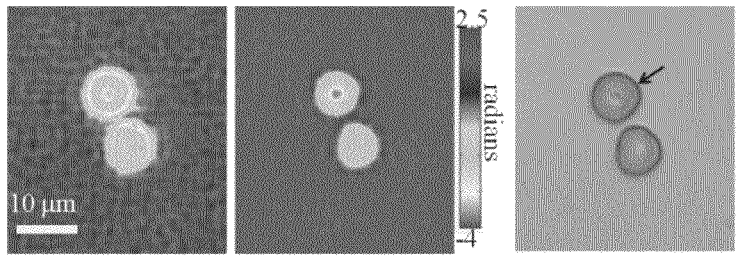
Figure 10C:
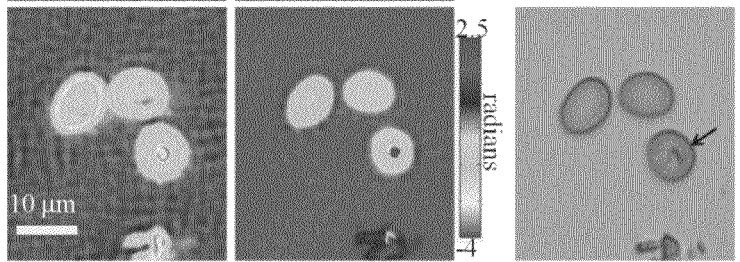

The holographic microscope has been tested for its ability to resolve malaria parasites in standard blood smears. FIGS. 10A, 10B, and 10C illustrate lens-free super-resolution images (amplitude and phase) of human red blood cells in a thin smear are shown, where the parasites (*Plasmodium falciparum*) were stained with the standard Giemsa stain. Multiple shifted holograms of the blood smear were obtained using the portable microscope shown in FIGS. 7A and 7B and were processed to create a single high resolution hologram of the blood smear. This super-resolution hologram is then processed using an iterative phase recovery technique as discussed earlier to reconstruct the amplitude and phase images of the blood cells as illustrated in FIGS. 10A, 10B, and 10C. For comparison purposes, bright-field microscope images obtained with a 40× objective-lens (0.65 numerical aperture) are also shown on the right-most side of FIGS. 10A, 10B, and 10C. These reconstructed images show that the infected red blood cells can easily be identified in both amplitude and phase images of our holographic super-resolution microscope, and can be distinguished from uninfected red blood cells which appear spatially homogenous in both amplitude and phase images. These results are quite promising for future studies that will aim to test this portable microscope for automated diagnosis of malaria in disease-endemic locations.

While the invention described herein has largely been described as a "lens free" imaging platform, it should be understood that various optical components, including lenses, may be combined or utilized in the systems and methods described herein. For instance, the devices described herein may use small lens arrays (e.g., micro-lens arrays) for non-imaging purposes. As one example, a lens array could be used to increase the efficiency of light collection for the sensor array. Such optical components, while not necessary to image the sample and provide useful data and results regarding the same may still be employed and fall within the scope of the invention. While embodiments of the present invention have been shown and described, various modifications may be made without departing from the scope of the present invention. The invention, therefore, should not be limited, except to the following claims, and their equivalents.

What is claimed is:

1. A lens-free system for imaging objects within a sample comprising:
   a stationary image sensor and a sample disposed adjacent to the image sensor at a distance $z_2$;
   an illumination source comprising partially coherent or incoherent light in the visible spectrum configured to scan in at least two-dimensions relative to the image sensor and illuminate the sample at a plurality of different locations, the illumination source being located a distance $z_1$ from the sample, wherein $z_2 \ll z_1$ and wherein the image sensor acquires a lens-free in-line low resolution hologram image of the objects within the sample at the plurality of different locations of the illumination source;
   at least one processor configured to reconstruct a single high resolution image of the objects within the sample based on the acquired lens-free in-line low resolution hologram image of the objects within the sample obtained from light originating at the plurality of different locations of the illumination source.

2. The system of claim 1, further comprising a sample holder configured to hold the sample, the sample holder disposed adjacent to the image sensor.

3. The system of claim 1, wherein the sample is disposed directly on an active area of the image sensor.

4. The system of claim 1, wherein the scan is in three dimensions, wherein the third dimension is one of angle or z distance relative to the image sensor.

5. The system of claim 1, wherein the illumination source comprises one of an aperture or optical waveguide configured to direct light to the sample.

6. The system of claim 1, wherein the illumination source comprises a display and wherein the at least two dimensional scan comprises moving a bright spot in at least two dimensions relative to the image sensor to illuminate the sample at a plurality of different locations.

7. The system of claim 1, wherein the scan of the illumination source comprises repeated incremental movement in the range of about 0.001 mm to about 500 mm.

8. The system of claim 5, further comprising a mechanically scanning stage configured to move the at least one of the aperture and optical waveguide relative to the image sensor.

9. The system of claim 8, further comprising at least one processor operatively connected to the mechanically scanning stage and configured to control the same.

10. A lens-free system for imaging objects within a sample comprising:
    stationary image sensor and a sample disposed adjacent to the image sensor at a distance $z_2$;
    one or more illumination sources comprising partially coherent or incoherent light in the visible spectrum coupled to an array of optical waveguides, wherein each optical waveguide of the array terminates at a different spatial location in three dimensional space and at a distance $z_1$ from the sample, wherein $z_2 \ll z_1$ and wherein the image sensor acquires a lens-free in-line low resolution hologram image of the objects within the sample from light emitted at the different spatial locations; and
    at least one processor configured to reconstruct a single high resolution image of the objects within the sample based on the acquired lens-free in-line low resolution hologram images of the objects within the sample obtained from light emitted at the plurality of different spatial locations.

11. The system of claim 10, further comprising a sample holder configured to hold the sample, the sample holder disposed adjacent to the image sensor.

12. The system of claim 10, wherein the sample is disposed directly on an active area of the image sensor.

13. The system of claim 10, wherein the one or more illumination sources comprises a plurality of LEDs or laser diodes, wherein each optical waveguide is coupled to a respective LED or laser diode.

14. The system of claim 13, further comprising a processor configured to selectively actuate the plurality of LEDs or laser diodes.

15. The system of claim 10, wherein the different spatial locations are disposed along a single dimension defining a line.

16. The system of claim 10, wherein the different spatial locations are disposed along two dimensions defining a plane.

17. The system of claim 10, wherein the different spatial locations are disposed along three dimensions defining a volume.

18. A lens-free system for imaging a sample comprising:
    a stationary image sensor and a sample disposed adjacent to the image sensor at a distance $z_2$;

an illumination source comprising an array of partially coherent or incoherent light sources in the visible spectrum coupled to respective optical waveguides terminating at physically separate locations that are separated from each other in the range of about 0.001 mm to about 500 mm and located at a distance $z_1$ from the sample, wherein $z_2 \ll z_1$ and wherein the image sensor acquires a lens-free in-line low resolution hologram image of the objects within the sample at each of the plurality of waveguides; and at least one processor configured to reconstruct a single high resolution image of the objects within the sample based on the acquired lens-free in-line low resolution hologram image of the objects within the sample obtained with light emitted from the plurality of waveguides.

19. The system of claim 18, wherein the array of light sources comprises a plurality of LEDs.

20. The system of claim 18, the array of light sources comprises a plurality of laser diodes.

21. A method of lens-free imaging of objects within a sample comprising:

illuminating a sample with an illumination source emitting partially coherent or incoherent light in the visible spectrum at a first position through at least one of an aperture or an optical waveguide;

obtaining a lens-free in-line low resolution hologram image of the objects within the sample from an image sensor at the first position;

illuminating the sample with the illumination source at a plurality of additional positions;

obtaining a plurality of additional lens-free in-line low resolution hologram images of the objects within the sample at each of the plurality of additional positions; and recovering a single high resolution image of the objects within the sample based at least in part on the plurality of lens-free in-line low resolution hologram images.

22. The method of claim 21, wherein the illumination source emits light at the plurality of positions by physical movement of the illumination source.

23. The method of claim 22, wherein the illumination source is moved incrementally in the range of about 0.001 mm to about 500 mm.

24. The method of claim 21, wherein the illumination source comprises an array of optical waveguides and wherein the plurality of positions are obtained by selection of individual optical waveguides within the array.

25. The method of claim 24, wherein each optical waveguide is operatively coupled to its own light-emitting diode (LED) and wherein the LEDs are sequentially turned on.

26. The method of claim 24, wherein each optical waveguide is operatively coupled to its own laser diode and wherein the laser diodes are sequentially turned on.

27. The method of claim 21, wherein the higher resolution image of the sample is obtained from less than 500 lens-free in-line low resolution hologram images.

28. The method of claim 21, wherein the higher resolution image of the sample is obtained from less than 5 lens-free in-line low resolution hologram images.

29. A lens-free system for imaging a sample comprising:

a stationary image sensor and a sample disposed adjacent to the image sensor at a distance $z_2$;

an illumination source comprising an array of partially coherent or incoherent light sources in the visible spectrum configured to direct light through a plurality of apertures located at physically separate locations that are separated from each other in the range of about 0.001 min to about 500 mm and located at a distance $z_1$ from the sample, wherein $z_2 \ll z_1$ and wherein the image sensor acquires a lens-free in-line low resolution hologram image of the objects within the sample with light emitted through each of the plurality of apertures; and at least one processor configured to reconstruct a single high resolution image of the objects within the sample based on the acquired lens-free in-line low resolution hologram images of the objects within the sample obtained from light emitted through each of the physical apertures.

* * * * *